United States Patent [19]
Stevens et al.

[11] Patent Number: 5,862,609
[45] Date of Patent: Jan. 26, 1999

[54] METHOD AND APPARATUS FOR DRYING SOLID FOODSTUFFS

[75] Inventors: Martinus Petrus Johannes Maria Stevens, Beers; Hubertus Gertruda Cornelis Peeters, Hegelsom, both of Netherlands

[73] Assignee: Backus Beheer B.V., Venlo, Netherlands

[21] Appl. No.: 799,030

[22] Filed: Feb. 10, 1997

Related U.S. Application Data

[63] Continuation-in-part of Ser. No. 329,706, Oct. 26, 1994, Pat. No. 5,600,899.

[51] Int. Cl.⁶ ..................................................... F26B 3/08
[52] U.S. Cl. ............................... 34/363; 34/210; 34/212; 34/219; 34/487; 34/507
[58] Field of Search .............................. 34/210, 212, 216, 34/217, 219, 363, 365, 487, 507

[56] References Cited

U.S. PATENT DOCUMENTS

| | | |
|---|---|---|
| 3,100,106 | 8/1963 | Bielenberg et al. . |
| 4,197,084 | 4/1980 | Mullner et al. . |
| 4,270,283 | 6/1981 | Ellis . |
| 4,337,083 | 6/1982 | Sweat . |
| 4,352,249 | 10/1982 | Rose . |
| 4,982,511 | 1/1991 | Frei . |
| 4,987,688 | 1/1991 | Petit et al. . |

FOREIGN PATENT DOCUMENTS

| | | |
|---|---|---|
| 458127 | 2/1945 | Belgium . |
| 0079523 | 5/1983 | European Pat. Off. . |
| 0271376 | 6/1988 | European Pat. Off. . |
| 7905532 | 1/1981 | Niger . |
| 336009 | 10/1930 | United Kingdom . |
| 1090063 | 11/1967 | United Kingdom . |

*Primary Examiner*—Henry Bennett
*Assistant Examiner*—Pamela A. Wilson
*Attorney, Agent, or Firm*—Webb Ziesenheim Bruening Logsdon Orkin & Hanson, P.C.

[57] ABSTRACT

A method and apparatus for drying solid foodstuffs is disclosed. The apparatus comprises a housing in which a gas permeable conveyor carrying the foodstuffs is arranged. The housing is divided into at least one drying section and at least one cooling section near the discharge end of the conveyor. Each section comprises means for generating a flow of drying or cooling gas along the foodstuffs, perpendicular to the conveyor. After passing along the foodstuffs, the gas is recirculated to drying or cooling means arranged in each section. The foodstuffs are thus first heated and then cooled down, so that the temperature thereof at the discharge end is substantially equal to the temperature at which the foodstuffs are supplied. The drying and cooling means are arranged such, that the temperature of the foodstuffs does not exceed 40° C., and that the foodstuffs leave the apparatus at a temperature of less than 5° C.

20 Claims, 6 Drawing Sheets

METHOD AND APPARATUS FOR DRYING SOLID FOODSTUFFS

CROSS-REFERENCE TO RELATED APPLICATIONS

This application is a continuation-in-part of U.S. Pat. Application Ser. No. 08/329,706, filed on Oct. 26, 1994, now U.S. Pat. No. 5,600,899.

FIELD OF THE INVENTION

The invention relates to a method and apparatus for drying solid foodstuffs, in particular vegetables which have been washed. More specifically, the invention relates to a method and apparatus for drying sliced vegetables following industrial slicing of these vegetables in a vegetable slicing plant.

BACKGROUND OF THE INVENTION

The European patent publication EP-A-0271376 describes a process and apparatus for drying plums by supplying them to an oven on a conveyor belt, and by circulating hot air through the oven. The air temperature is uniform throughout the oven, and the temperature of the plums at the discharge is higher than their temperature at entering the oven.

The European patent publication EP-A-0079523 discloses a device and process for drying solid particles in a suspension, like e.g. urban sludges or non-edible waste. The drying installation disclosed in this document comprises a first upstream section in which the product is dried by circulating air which is heated in calorific heaters. The air that is discharged from this first section is led through a heat exchanger, mixed with discharged air from a second, downstream section and recirculated into the first section. In the second, downstream section, the product is dried by air that is heated by condensers of a heat pump, the evaporator of which is connected to the heat exchanger of the first section. The temperatures at which this drying installation operates are in the range of about 100° C., and therefore much higher than necessary for drying vegetables.

Nowadays, vegetables to be dried after washing are supplied to a centrifuge, and dried therein in a discontinuous process. The drawbacks of this drying mode are that the product to be dried is damaged by the rotating drum and by the forces which the products exert on each other, and that the damaged and torn apart parts are left behind in the centrifuge, which may lead to the centrifuge becoming unbalanced and less hygienic due to possible material infection.

SUMMARY OF THE INVENTION

The present invention seeks to provide an improved method of drying solid foodstuffs, in particular vegetables which have been washed. Such vegetables may include carrots, potatoes, cauliflower, lettuce and alike. The principle underlying the method can, however, also be used for other vegetables and foodstuffs in solid condition.

The present invention further has for its object to provide a method of drying solid foodstuffs with which no centrifugal forces are exerted on the foodstuffs.

The present invention also has for its object to provide a method for drying solid foodstuffs with which the temperature of the foodstuffs after drying is substantially the same as before drying.

According to the present invention, the foodstuffs are supplied in a substantially flat bed. At a first location a relatively cool first drying gas is supplied, and the relatively cool first drying gas is urged to flow through or along the foodstuffs substantially perpendicularly to the direction of the bed, after which the gas is cooled to below ambient temperature, and recirculated to the first location in a closed loop. At a second location, spaced from said first location, a second drying gas is urged to flow through or along the foodstuffs substantially perpendicularly to the direction of the bed. This second location lies upstream of the first location as seen in the direction of supply, and the temperature of the second drying gas is higher than that of the first drying gas. Subsequently, the second drying gas is reheated and dried and redcirculated to the second location in a closed loop. Finally the dried foodstuffs are discharged.

Preferably, yet a further drying gas is supplied at a further location between the first and second locations, and a further drying gas is urged to flow through or along the foodstuffs substantially perpendicularly to the direction of the bed. The temperature of the further drying gas may lie between the temperatures of the first and second drying gases, and the further drying gas may be reheated and dried and recirculated to the further location in a closed loop. Thus a multistep drying process is achieved.

The drying gas may be heated and dried before being urged to flow through or along the bed for the first time. The direction of flow through the bed may be upwards, and the gas may be recirculated along the outside of the bed.

Preferably, the gas used as drying gas is air. With foodstuffs that are sensitive to oxygen it is also possible, however, to use nitrogen or another inert gas for drying, also because the gas used in the drying process is recirculated after the absorbed water vapor has been removed.

The temperature of the foodstuffs during drying preferably does not exceed 40° C., and the foodstuffs in the bed are preferably first heated and then cooled down again during drying, such that their temperature at discharge is substantially the same as the temperature at which the foodstuffs are supplied. The discharge temperature of the dried foodstuffs does not exceed 10° C. and may be less than 10° C. and, preferably, are less than 5° C.

The invention also seeks to provide an improved apparatus for drying solid foodstuffs, specifically washed vegetables. According to the invention, such apparatus comprises:

a) foodstuff supply means for supplying the foodstuffs in a substantially flat bed, b) gas supply and cooling means for supplying a first drying gas, c) first flow generating means connected in series with said gas supply and cooling means for urging the first drying gas to flow through or along the bed substantially perpendicularly to the direction thereof at a first location, d) means for connecting the first flow generating means to the gas supply and cooling means in a closed circuit, e) gas supply and heating means for supplying and heating a second drying gas, f) second flow generating means located upstream of the first flow generating means as seen in the direction of supply, connected in series with the gas supply and heating means and arranged for urging the second drying gas to flow through or along the bed substantially perpendicularly to the direction thereof, g) means for connecting the second flow generating means to the gas supply and heating means in a closed circuit, and h) discharge means connected in series with the foodstuff supply means for discharging the dried foodstuffs.

BRIEF DESCRIPTION OF THE DRAWINGS

Further details of the method and apparatus of the invention will become apparent from the following description, wherein reference is made to the appended drawing, in which.

DETAILED DESCRIPTION OF A PREFERRED EMBODIMENT

Figure 1:
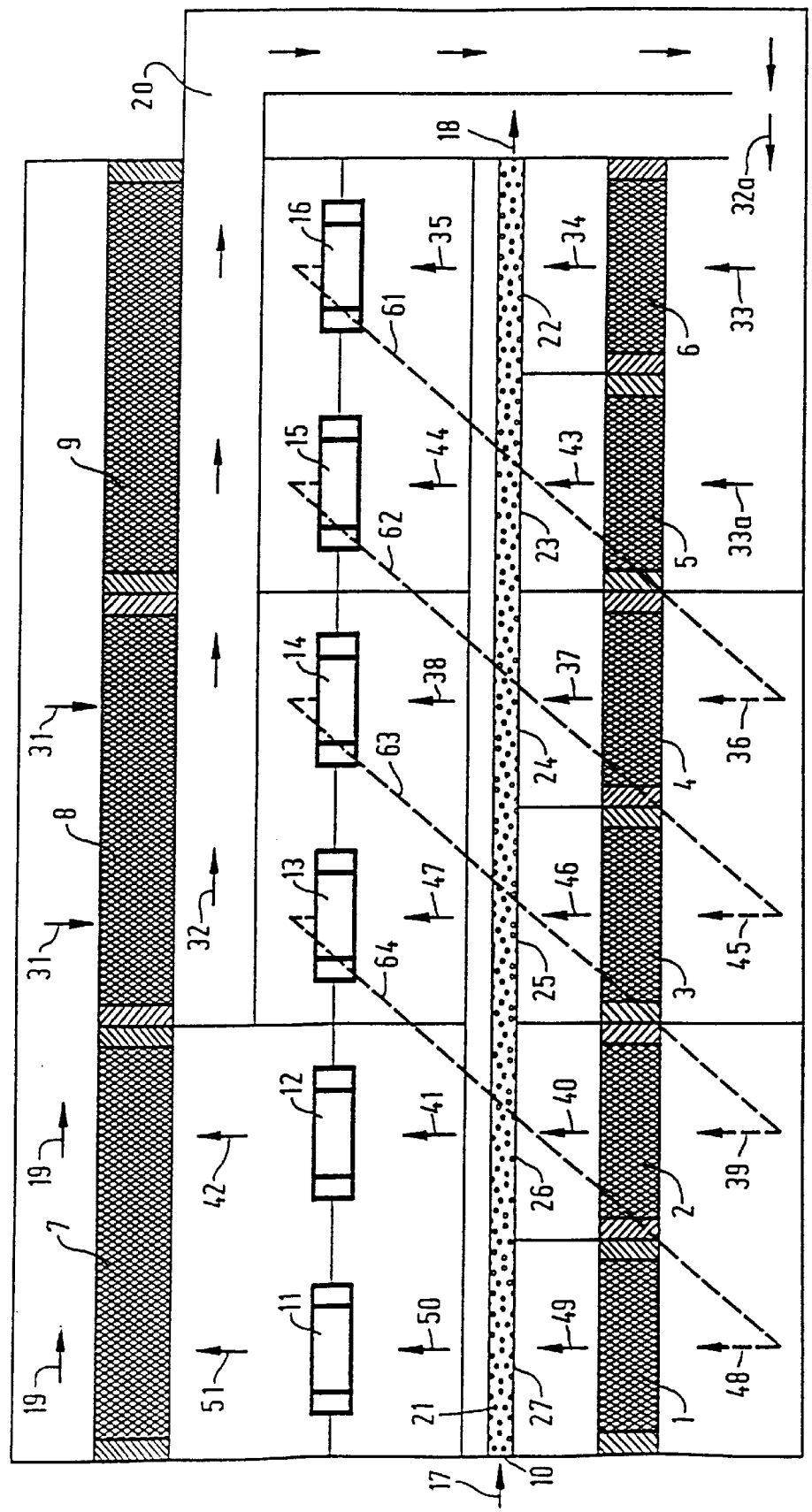
FIG. 1 is a broken isometric view of the drying apparatus or the co-pending application Ser. No. 08/329,706.

In the drawing the apparatus as claimed in the applicant's co-pending application Ser. No. 08/329,706 is shown to comprise six successive heaters 1–6, coolers 7, 8 and 9 and fans 11–16. It will be apparent, however, that it is also possible to use a larger or a smaller number of heaters, fans and coolers, dependent on the foodstuffs or product to be dried, the nature and humidity thereof, the temperature at the supply point and the desired temperature at the discharge point and the manner in which the foodstuffs are stacked on the conveyor belt. The optimum number of heaters, coolers and fans can be adjusted by a person skilled in this field of the art, also in dependence on the capacity of the coolers, heaters and fans.

The following explanation of the system is only by way of example, therefore. The product to be dried, such as sliced carrots or lettuce, is supplied at arrow 17 by means of a flat bed, such as a perforated conveyor belt 10 or a perforated shaker conveyor and, after drying, discharged at the other side, indicated by the arrow 18. Air is used as the cooling gas, said air being supplied at 19 and having a humidity of 100% and a temperature of for example 5° C. This air flow is passed through the cooler 8 at 31, whereby the air is cooled down to –5° C. A large part of the water vapor contained condenses thereby and freezes on to the cooler. That is why the cooler 9 is arranged beside the cooler 8, so that when the cooler 8 has built up too much resistance as a result of icing, the cooler 9 can be used and the cooler 8 can be defrosted. The air obtained at 32 has a temperature of –5° C. and a relative humidity of 100%. This cold air is supplied to the heater 6 and the heater 5 by means of the line 20. Different temperatures are set for these two heaters, so that, seen in the longitudinal direction of the conveyor belt, drying of the product to be dried takes place from the starting point 17 to the end point 38 with air having a decreasing temperature and, along the first part, a decreasing moisture content. Upon being supplied the air flow 33 has a temperature of –5° C. and a relative humidity of 100% said air being heated in the heater 6 to a temperature of 3° C. and a relative humidity of 55%. This air flow is passed through section 22 of the conveyor belt 10, whereby the quantity of foodstuffs present thereon, which has already been largely dried, is in particular cooled down to the temperature at which the product is supplied at 17. This temperature is about 2° C. The product which at 17 is supplied to the conveyor belt 10 having openings 21, is substantially dried at a temperature of 12°–15° C. in the first five selections of the conveyor belt indicated at 27–23, and cooled down again to the supply temperature, viz. about 2°–3° C., in the last part of the conveyor belt 22. Numeral 35 indicates the air leaving the conveyor belt at section 22, which air is supplied, via line 61, to the heater 4 by means of the fan 16. The product to be dried present on section 23 of the belt 10 is dried by means of air from the air flow 33a having a temperature of –5° C., said air being supplied to the heater 5 and having a temperature of 20° C. and a relative humidity of 25% upon exiting the heater 5. As a result of the low relative humidity the last remainder of moisture is removed from the product to be dried as well as possible, and the air discharged from section 23 of the conveyor belt 10 at 44 is supplied, by means of fan 15, to the heater 3 via the line 62. In the central sections 24 and 25 of the conveyor belt 10 an air flow 37 having a temperature of 25° C. and a relative humidity of 25% is obtained via the line 36 and heater 4, and after drying of the product on section 24 of the belt an air flow 38 is obtained, which at 39 is supplied to the heater 2 by means of fan 14, via line 63. In the heater 2 the air is heated to 27° C. and a relative humidity of 35%, and then passed through the product to be dried on section 26 of the belt 10, after which the air is discharged at 41, the air flow 42 being passed through cooler 7 by means of fan 12, where it is cooled down to 5° C. and a relative humidity of 100%.

The air flow at 45 is passed through the heater 3, whereby an air flow having a temperature of 25° C. and a relative humidity of 25% is obtained, which is passed along and through the product to be dried present on section 25 of the conveyor belt 10, and the cooled-down, more humid air is supplied, via lines 64 and 48, to the heater 1 by means of the fan 13, so that air having a temperature of 27° C. and a relative humidity of 35% is obtained at 49, which is passed through section 27 of conveyor belt 10, resulting in the air flow 50, which is passed through the cooler 7, by means of fan 11, as air having a temperature of 20° C. and a relative humidity of 65%, and supplied to cooler 8 again as a gas flow 19 having a temperature of 5° C. and a relative humidity of 100%, in order for the cycle to be repeated.

Initially the air flows from the fans 15 and 16 do not have the same temperature and humidity, but this air is preferably mixed prior to being passed through the heaters 3 and 4, so that the air supplied to the heaters 3 and 4 has a common temperature of 12° C. and a relative humidity of 50%.

Instead of the six fans 11–16 used in the embodiment described, it is also possible to use fewer fans, for example three, by using six fans, however, it is possible to achieve a more or less perpendicular displacement of the air flow through the product to be dried. This will prevent the occurrence of considerable accelerations in horizontal direction in the air flow, which may result in the product to be dried being blown off locally. The air velocity through or along the product to be dried should preferably be limited to about 2 m/sec., since at a higher air velocity the product is blown off or displaced in a disadvantageous manner, so that an irregular distribution over the belt of the product to be dried results. If the air supplied were to be distributed over six passages at 32a, viz. over the six heaters 3–6, the maximum air circulation per hour would be too small to remove the desired amount of moisture form the product. That is why the air flows through the fans are combined in two streams, so that the total amount of air circulating per hour is doubled. By using six independent heaters the temperature and the drying rate can readily be controlled at any point along the belt.

Every product to be dried has its own warming-up time and its own cooling-down time, dependent on the diameter of the particles to be dried. Six different temperatures can be set by the six independent heaters, dependent on the requirements of the product to be dried. Each heater can be controlled separately, therefore. The fact that in the embodiment described the heating capacity is respectively controlled by two streams does not mean that it is not possible to adjust different temperatures for all six heaters.

After the usual slicing and washing freshly sliced vegetables contain 8–30% adhering water. In order to obtain an attractive appearance and a satisfactory storage life of the packed, fresh product it is necessary to reduce the amount of adhering water by 60–80%.

The above-described system is capable of removing about 140 kg of moisture per hour. After washing, sliced lettuce contains 30% adhering moisture. During drying the amount of adhering moisture is reduced to 6%. The time duration of the lettuce in the drier of the invention is about 15–20 minutes. The maximum layer thickness on the conveyor belt is about 12–15 cm. All this can be controlled by suitably selecting the width of the conveyor belt, whereby for the present embodiment a length of about 6 mn and a width of 1,3 m have been selected.

The drawing does not show any control equipment for the temperature and humidity measurement equipment, because an expert in this field of the art will be familiar therewith.

It is possible to combine the heaters 3 and 4, as well as the heaters 1 and 2, since these heaters 1, 2 and 3, 4 respectively transmit an equal amount of heat to the gas to be passed therethrough.

Figure 2:
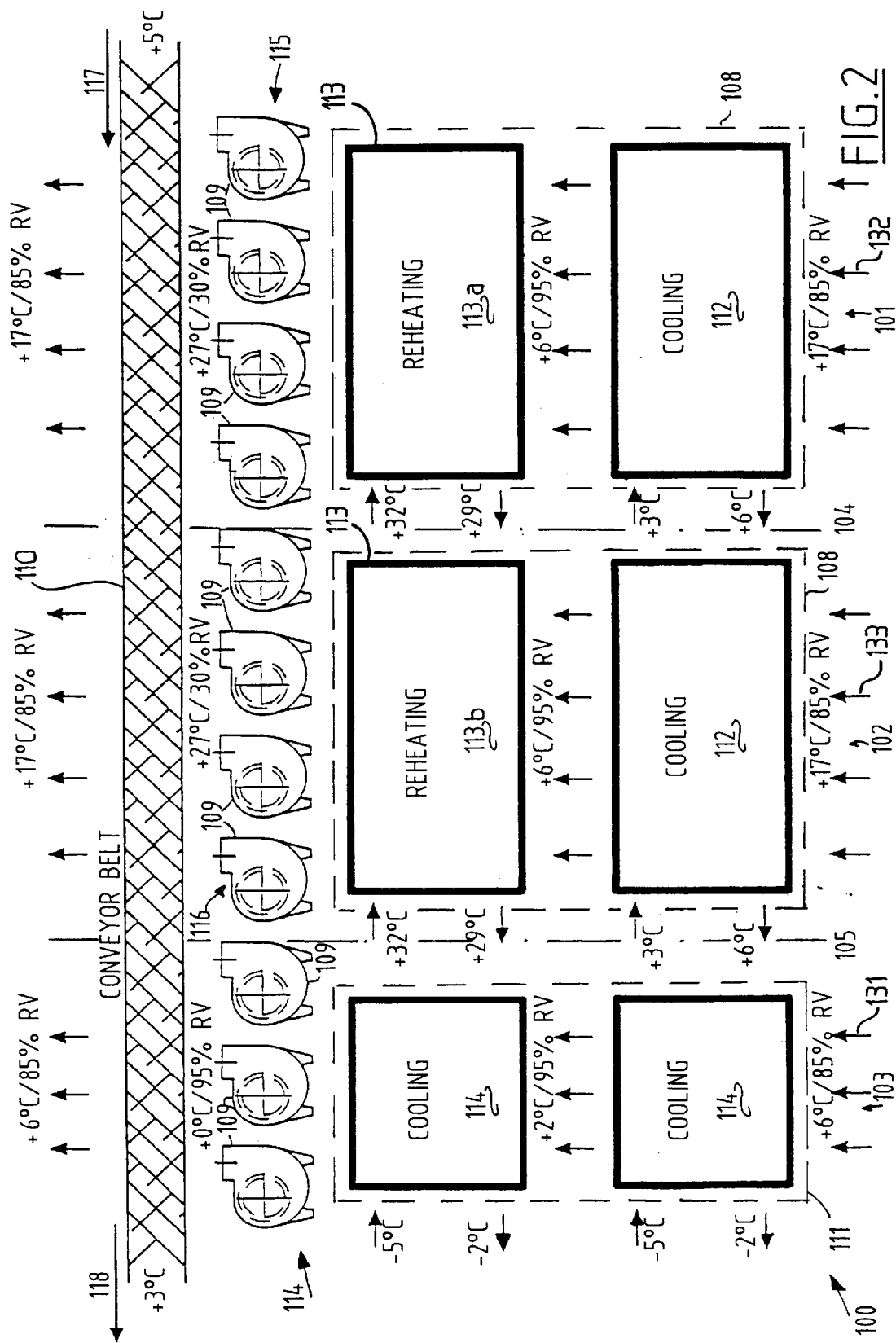
FIG. 2 is a diagram schematically illustrating the main elements of the drying apparatus of the present invention.
Figure 3:
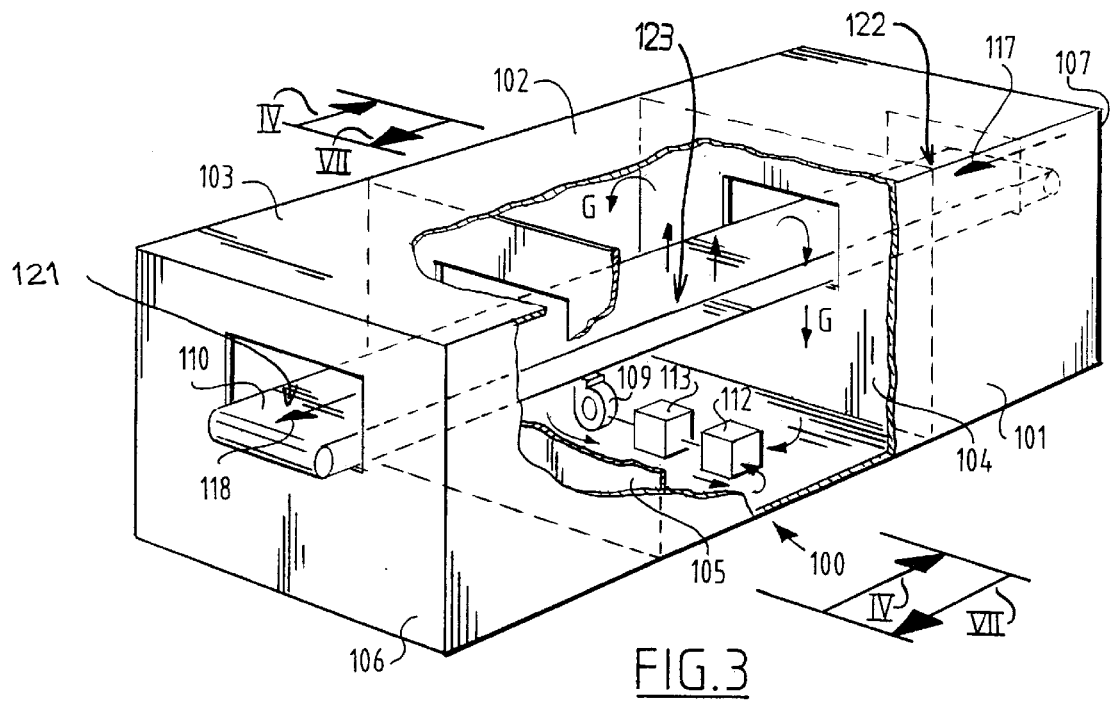
FIG. 3 is a broken schematic perspective view of the apparatus of FIG. 2.
Figure 4:
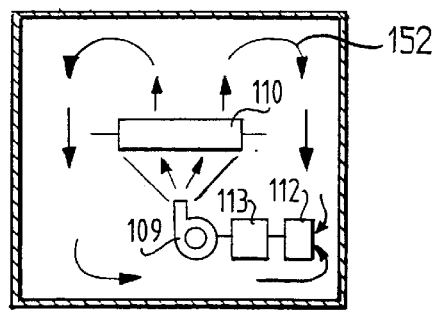
FIG. 4 is a schematic cross-sectioned view along the line IV—IV in FIG. 3, FIGS. 5 and 6 are diagrams of a combined cooler/heater and a cooler, respectively for use in the apparatus of the invention.

The apparatus 100 (FIGS. 2, 3) for drying solid foodstuffs according to the present invention comprises a housing having a front wall 106, a rear wall 107, and a number of intermediate walls 104, 105, dividing the housing into separate drying sections 101, 102 and a cooling section 103. It should be understood however, that the apparatus could comprise a ditterent number of drying and cooling sections. The cooling section 103 is arranged at a first location 121 at the downstream end of a gas permeable conveyor belt 110, on which the foodstuff to be dried is supplied as indicated by the arrow 117 and discharged as indicated by the arrow 118. The drying section 101 is arranged at a second location 122 upstream of the cooling section 103, and the drying section 102 is arranged at a further location 123 between the first and second locations. The foodstuffs are cooled by a cooling first drying gas indicated by arrows 131 in FIG. 2. Additionally, at the further location, a further drying gas G is supplied. The conveyor belt 110 is driven by speed controllable drive means, like e. g. a frequency controlled electric or hydraulic motor (not shown). Each drying section 101, 102 comprises drying means 108, consisting of a first heat exchanger 112 where the drying gas is cooled and a second heat exchanger 113 connected in series therewith, where the drying gas is reheated. Drying section 101 includes a second drying gas indicated by arrows 132 in FIG. 2; and drying section 103 includes a further drying gas indicated by arrows 133 in FIG. 2. Each drying section 101, 102 further comprises flow generating means. Drying section 101 includes a second flow generating means 115 and drying section 102 includes an additional or further flow generating means 116, the second flow generating means 115 and the additional or further flow generating means 116 are each shown in FIG. 2. The second flow generating means 115 and the additional or further flow generating means 116 each consist of a plurality of fans 109 arranged between heating means 113 and the conveyor belt 110. The heating means 113 includes a second heating means 113a and an additional or further heating means 113b. By arranging the fans 109 directly under the conveyor belt 110, only the part of the apparatus between the fans and the conveyor belt is subjected to an overpressure. The rest of the apparatus is subjected to a slight underpressure, as a result of which leakage of drying gas outside the apparatus is prevented, and less strict requirements apply to the structual integrity of the apparatus. The temperatures and relative humidities in the drying sections 101, 102 are substantially equal. The drying gas is blown out through the fans 109 at a temperature of approximately 27° C. and a relative humidity of approximately 30%. At least one of the second drying gas and the further drying gas are dried to a relative humidity of less than 50% and preferably less than 30%. After passing through the conveyor belt 110 carrying the foodstuff to be dried, the drying gas will attain a temperature of approximately 17° C. and a relative humidity of approximately 85%. The second drying gas is then recirculated in a closed loop identified by arrows 152 to drying means 108 (FIG. 4), where the temperature of the gas is lowered to 6° C. in the first heat exchanger 112, whereby the relative humidity reaches a value of approximately 95%, after which the gas is reheated to approximately 27° C. and dried to approximately 30% relative humidity in the second heat exchanger 113.

Figure 5:
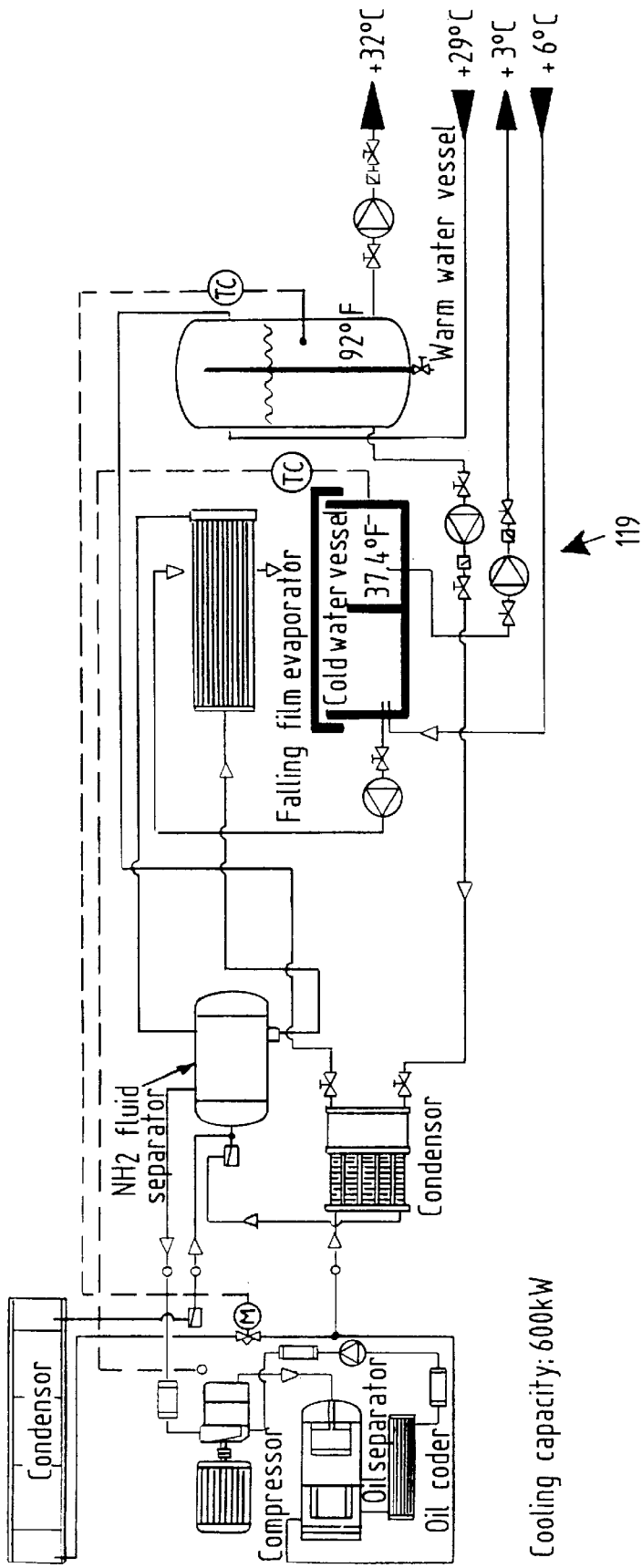

Both the first and the second heat exchanger 112, 113 respectively are connected to a combined heating and cooling circuit 119 (FIG. 5). The cooler part of this combined heater/cooler 119 supplies cold water at a temperature of approximately 3° C. to the first heat exchanger 112, in which the water is heated to approximately 6° C. by the passing drying gas. The combined heater/cooler 119 further supplies warm water at a temperature of approximately 32° C. to the second heat exchanger 113, where this water is cooled to approximately 29° C. by the passing drying gas.

Figure 6:
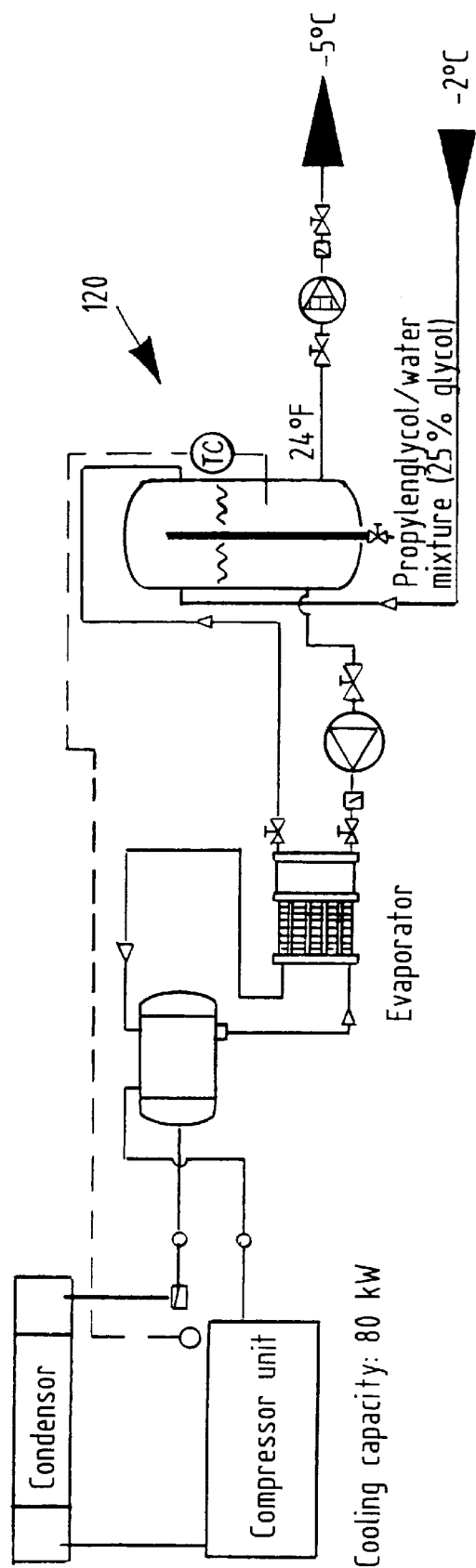
Figure 7:
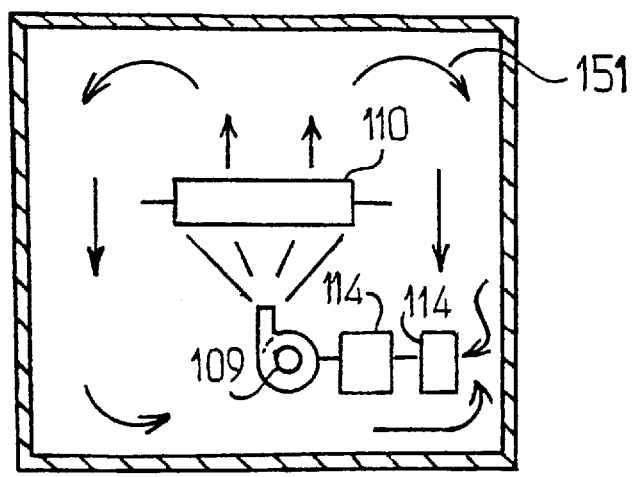
FIG. 7 is a schematic cross-sectioned view along the line VII—VII in FIG. 3.

The cooling section 103 comprises cooling means 111, which consists of two heat exchangers 114 connected in series. In these heat exchangers 114 the cooling gas is cooled down in two steps from a temperature of approximately 6° C. to a temperature of approximately 0° C. In the first step the gas is cooled from 6° C. to approximately 2° C., whereby the relative humidity rises from 85% to approximately 95%. In the second step the cooling gas is cooled down to approximately 0 ° C., with a relative humidity being maintained of approximately 95%. Thus, the drying gas at the first location 121 is cooled in two subsequent cooling steps. The cooling gas is then blown through the conveyor belt 110 by a first flow generating means 114, thus cooling the foodstuffs shortly before they are discharged. The cooling gas, which is thus heated to approximately 6° C. is then recirculated to the heat exchangers 114 in a closed loop identified by arrows 151 in FIG. 7. The heat exchangers 114 are both connected to a cooling circuit 120 (FIG. 6), which supplies a mixture of 25% glycol and water at a temperature of approximately −5° C. This glycol/water mixture is heated to approximately −2° C. in the heat exchangers 114.

The apparatus according to the present invention allows a high cooling output to be achieved at relatively low energy consumption, due to the higher evaporation temperatures, whereby the efficiency of the cooling circuit is increased. Furthermore the apparatus is easier to maintain and to clean then the apparatus of my copending application, since the drying gas is only recirculated in each separate drying or cooling section, and therefore no piping is required for recirculating the gas through the entire apparatus.

The advantages obtained by using this method and this apparatus lie in the fact that with this apparatus there is no loss of product, as is the case with centrifuges. The temperature of the product to be discharged can readily be controlled, which is why the product obtained from the drying plant has about the same temperature as the product to be supplied, and will normally not be higher than 40° C. during the drying process of the invention. Furthermore, the method can be carried out continuously, whilst the apparatus is easy to clean, in particular in those places where the product to be dried comes into contact with the apparatus.

We claim:

1. A method for drying solid foodstuffs, comprising the steps of:
   a) supplying the foodstuffs in a substantially flat bed,
   b) at a first location supplying a relatively cool first drying gas, and urging the relatively cool first drying gas to flow through or along the foodstuffs substantially perpendicularly to the direction of the bed,
   c) cooling the fast drying gas to below ambient temperature and recirculating it to the first location in a closed loop,
   d) at a second location spaced from said first location supplying a second drying gas and urging the second drying gas to flow through or along the foodstuffs substantially perpendicularly to the direction of the bed, the second location lying upstream of the first location as seen in the direction of supply of the foodstuffs and the temperature of the second drying gas being higher than that of the first drying gas,
   e) reheating and drying the second drying gas and recirculating it to the second location in a closed loop, and
   f) discharging the dried foodstuffs.

2. The method as claimed in claim 1, wherein a further drying gas is supplied at a further location between said first and second locations; and said further drying gas is urged to flow through or along the foodstuffs substantially perpendicularly to the direction of the bed, the temperature of the further drying gas is between the temperatures of the first and second drying gases, and the further drying gas being reheated and dried and recirculated to the further location in a closed loop.

3. The method as claimed in claim 2, wherein at least one of the second and further drying gas is dried to a relative humidity of less than 50%.

4. The method as claimed in claim 2, wherein at least one of the second and further drying gas is dried to a relative humidity of less than 30%.

5. The method as claimed in claim 1, wherein the steps b) through e) are repeated at least once before the dried foodstuffs are discharged.

6. The method as claimed in claim 1, wherein the second drying gas is urged to flow through or along the bed from the bottom upward, and is recirculated along the outside of the bed.

7. The method as claimed in claim 1, wherein the first drying gas and the second drying gas are air.

8. The method as claimed in claim 1, wherein as seen in the direction of supply the bed is first heated and dried and subsequently cooled down, such that the discharge temperature of the dried foodstuffs is substantially equal to the supply temperature thereof.

9. The method as claimed in claim 8, wherein the discharge temperature of the dried foodstuffs does not exceed 10° C.

10. The method as claimed in claim 9, wherein the first drying gas at the first location is cooled to approximately 0° C.

11. The method as claimed in claim 10, wherein the first drying gas at the first location is cooled in two subsequent cooling steps.

12. The method as claimed in claim 1, wherein during drying the temperature of the foodstuffs does not exceed 40° C.

13. The method as claimed in claim 12, wherein the discharge temperature of the dried foodstuffs does not exceed 5° C.

14. An apparatus for drying solid foodstuffs, comprising:
   a) foodstuff supply means for supplying the foodstuffs in a substantially flat bed,
   b) cooling means for cooling a first drying gas,
   c) first flow generating means connected in series with said cooling means for urging the first drying gas to flow through or along the bed substantially perpendicularly to the direction thereof at a first location,
   d) means for connecting the first flow generating means to the cooling means in a closed circuit,
   e) heating means for heating a second drying gas,
   f) second flow generating means located upstream of the first flow generating means as seen in the direction of supply, connected in series with the heating means and arranged for urging the second drying gas to flow through or along the bed substantially perpendicularly to the direction thereof,
   g) means for connecting the second flow generating means to the heating means in a closed circuit, and
   h) discharge means connected in series with the foodstuff supply means for discharging the dried foodstuffs.

15. The apparatus as claimed in claim 14, further comprising:
   i) additional heating means for heating an additional drying gas,
   j) additional flow generating means located between the first and second flow generating means, connected in series with the additional heating means and arranged for urging the additional drying gas to flow through or along the bed substantially perpendicularly to the direction thereof, and
   k) means for connecting the additional flow generating means to the additional heating means in a closed circuit.

16. The apparatus as claimed in claim 15, further comprising cooling means connected in series with the heating means.

17. The apparatus as claimed in claim 14, wherein the foodstuff supply means and discharge means comprise a gas permeable conveyor belt.

18. The apparatus as claimed in claim 14, wherein the heating means are arranged under the conveyor belt, and the flow generating means comprise fans arranged between the heating means and the conveyor belt.

19. The apparatus as claimed in claim 14, further comprising cooling means connected in series with the heating means.

20. The apparatus as claimed in claim 14, wherein the cooling means comprise at least two coolers connected in series.

* * * * *

UNITED STATES PATENT AND TRADEMARK OFFICE
CERTIFICATE OF CORRECTION

PATENT NO. : 5,862,609            Page 1 of 2
DATED : January 26, 1999
INVENTOR(S) : Martinus Petrus Johannes Maria Stevens et al.

It is certified that error appears in the above-identified patent and that said Letters Patent is hereby corrected as shown below:

Title Page, [56] References Cited, under FOREIGN PATENT DOCUMENTS, fourth reference, "Niger" should read --Netherlands--.

Title Page, [57] ABSTRACT, Line 2, delete "comprises" and insert --has--.

Title Page, [57] ABSTRACT, Line 6, delete "comprises means" and insert --includes an assembly--.

Title Page, [57] ABSTRACT, Line 9, delete "means" and insert --assemblies--.

Title Page, [57] ABSTRACT Line 13, delete "means" and insert --assemblies--.

Column 1 Line 4 "APPLICATIONS" should read --APPLICATION--.

Column 3 Line 20 after "invention," insert --and--.

Column 4 Line 5 "selections" should read --sections--.

Column 5 Line 42 "ditterent" should read --different--.

UNITED STATES PATENT AND TRADEMARK OFFICE
CERTIFICATE OF CORRECTION

PATENT NO. : 5,862,609
DATED : January 26, 1999
INVENTOR(S) : Martinus Petrus Johannes Maria Stevens et al.

It is certified that error appears in the above-identified patent and that said Letters Patent is hereby corrected as shown below:

Column 5 Line 50 between "second locations" and period, insert --; additionally, at the further location, a further drying gas G is supplied--.

Column 5 Line 52 delete "Additionally, at the further location, a further drying gas G is supplied."

Column 7 Line 38 Claim 2, after "second locations" delete semicolon and insert comma --,--.

Column 8 Line 56 Claim 18 "claimed in claim 14" should read --claimed in claim 17--.

Signed and Sealed this

Ninth Day of November, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO. : 5,862,609
DATED : January 26, 1999
INVENTOR(S) : Martinus Petrus Johannes Maria Stevens et al.

It is certified that error appears in the above-identified patent and that said Letters Patent is hereby corrected as shown below:

Title Page, insert:
--[30]   Foreign Application Priority Data
         Apr. 23, 1992 [NE]  Netherlands.....92-00740
         Apr. 22, 1993 [EPO] Europe..........93-201172--.

Signed and Sealed this

Eleventh Day of July, 2000

Attest:

Q. TODD DICKINSON

Attesting Officer

Director of Patents and Trademarks